United States Patent
Duchon et al.

(10) Patent No.: US 7,822,750 B2
(45) Date of Patent: Oct. 26, 2010

(54) METHOD AND SYSTEM TO COMPARE DATA ENTITIES

(75) Inventors: Andrew Duchon, Somerville, MA (US); Kari Kelton, Washington, DC (US); Pacey Foster, Dorchester, MA (US); Kara Orvis, Melrose, MA (US)

(73) Assignee: Aptima, Inc, Woburn, MA (US)

( * ) Notice: Subject to any disclaimer, the term of this patent is extended or adjusted under 35 U.S.C. 154(b) by 381 days.

(21) Appl. No.: 12/014,750

(22) Filed: Jan. 15, 2008

(65) Prior Publication Data

US 2008/0250064 A1    Oct. 9, 2008

Related U.S. Application Data

(60) Provisional application No. 60/885,401, filed on Jan. 17, 2007.

(51) Int. Cl.
G06F 17/30 (2006.01)
(52) U.S. Cl. .................................. 707/738; 707/739
(58) Field of Classification Search .............. 707/738, 707/739
See application file for complete search history.

(56) References Cited

U.S. PATENT DOCUMENTS

| | | | |
|---|---|---|---|
| 6,351,778 B1* | 2/2002 | Orton et al. ................ 719/310 |
| 6,687,696 B2 | 2/2004 | Hofmann et al. | |
| 6,728,695 B1* | 4/2004 | Pathria et al. ......... 707/999.002 |
| 6,917,952 B1 | 7/2005 | Dailey | |
| 6,968,332 B1* | 11/2005 | Milic-Frayling et al. .... 707/723 |
| 7,130,837 B2* | 10/2006 | Tsochantaridis et al. ...... 706/55 |
| 7,289,985 B2* | 10/2007 | Zeng et al. ............ 707/999.003 |
| 7,305,389 B2* | 12/2007 | Zeng et al. ............ 707/999.005 |
| 7,519,201 B2* | 4/2009 | Yang et al. ................. 382/118 |
| 7,681,186 B2* | 3/2010 | Chang et al. ................ 717/143 |
| 2003/0182631 A1* | 9/2003 | Tsochantaridis et al. .... 715/531 |
| 2007/0098254 A1* | 5/2007 | Yang et al. .................. 382/159 |
| 2007/0118498 A1* | 5/2007 | Song et al. ..................... 707/1 |
| 2008/0140616 A1* | 6/2008 | Encina et al. .................. 707/3 |
| 2009/0234878 A1* | 9/2009 | Herz et al. .................. 707/102 |

OTHER PUBLICATIONS

Getoor et al. "A Latent Dirichlet Model for unsupervised Entity resolution"—SIAM International Conference on data Mining, 2006, (pp. 47-58).*

(Continued)

Primary Examiner—John E Breene
Assistant Examiner—Anh Ly
(74) Attorney, Agent, or Firm—John J Brooks, III; John Brooks Law LLC (57) ABSTRACT

The present invention relates in general to methods and systems for comparing and maximizing the appropriateness of a first set of one or more data objects to a set of second data objects. In one embodiment, the first set of data objects represent one or more tasks to be fulfilled by a set of capabilities represented by the second data objects. In one embodiment, this invention provides an effective and accurate method and system to compare and maximize the appropriateness between the requirements of a task and the second set's capabilities, while these capabilities and requirements are contained, even if only latently, in data objects such as written documents, electronic databases or other sources of data and information. In one embodiment, topic modeling techniques are utilized to compare the data objects.

25 Claims, 5 Drawing Sheets

OTHER PUBLICATIONS

Rhee et al. "Information Modelling for Adaptive Composition in Collaborative Work Environment"—International Journal 2005 (pp. 185-190).*

Florent Money, Pedro Quelhas, Daniel Gatica-Perez, Jena-Marc Odobez, Constructing Visual Models with a Latent Space Approach, IDIAP Research Report 05-14, Feb. 2005, IDIAP Research Institute, Switzerland.

Darrell Laham, Winston Bennett, Jr., Thomas K. Landauer, An LSA-Based Software Tool for Matching Jobs, People, and Instruction, Interactive Learning Environments, 2000, vol. 8, No. 3, pp. 171-185, Swets&Zeitlinger, USA.

Blei, D., Ng, A. and Jordan, J. (2003). Latent Dirichlet allocation. Journal of Machine Learning Research, 3:993-1022, Jan. 2003, USA. http://www.cs.berkeley.edu/~blei/papers/blei03a.pdf.

Hofmann, Thomas (1999). Probabilistic Latent Semantic Indexing, Proceedings of the 22nd Annual ACM Conference on Research and Development in Information Retrieval, USA. http://www.cs.brown.edu/people/th/papers/Hofmann-SIGIR99.pdf.

Hofmann, Thomas (2001). Unsupervised Learning by Probabilistic Latent Semantic Analysis. Machine Learning, 42:177-196, USA.

Steyvers, J. and Griffiths, T. (2003). Prediction and semantic association. Advances in Neural Information Processing Systems 15. USA.

Steyvers, J. and Griffiths, T. (2007). Probabilistic topic models. To appear in T. Landauer, D McNamara, S. Dennis, & W. Kintsch (eds), Latent Semantic Analysis: A road to meaning. Laurence Erlbaum, USA.

Palmer, M., Kingsbury, P. and Gildea, D. (2005) The Proposition Bank: An Annotated Corpus of Semantic Roles. Computational Linguistics, 31(1), 71-106, USA.

Sivic, J. Russell, B., Efros, A., Zisserman, A. and Freeman, W. (2005). "Discovering object categories in image collections." Proc. Int'l Conf. Computer Vision, Beijing.

Griffiths, T.L., Steyvers, M., Blei, D.M. and Tenebaum, J.B.(2004) Integrating topics and syntax. Advances in Neural Information Processing Systems 17, USA.

Markus, M.P., Santorini, B., and Marcinkiewicz, M.A (1993) Building a Large Annotated Corpus of English: The Penn Treebank. Computational Linguistics, 19(2), 313-330, USA.

Griffiths, T.L., Steyvers, M., and Tenebaum, J.B. (2007). Topics in semantic representation. Psychological Review, vol. 114, No. 2, 211-244, USA.

Appelt, D.E. and Israel, David (1999). Introduction to Information Extraction Technology. International Joint Conference on Artificial Intelligence, Stockholm, Sweden.

* cited by examiner

METHOD AND SYSTEM TO COMPARE DATA ENTITIES

CROSS-REFERENCE TO RELATED APPLICATIONS

This invention claims benefit of U.S. Provisional Patent Application No. 60/885,401 filed on Jan. 17, 2007 which is herein incorporated by reference in its entirety.

STATEMENT REGARDING FEDERALLY SPONSORED RESEARCH OR DEVELOPMENT

This invention was made with Government support under Contract #FA8650-06-M-4420 awarded by the U.S. Air Force Research Lab. The Government has certain rights in the invention.

REFERENCE TO SEQUENCE LISTING, A TABLE, OR A COMPUTER PROGRAM LISTING COMPACT DISC APPENDIX

Not Applicable.

BACKGROUND OF THE INVENTION

The present invention relates in general to a method and system for comparing and maximizing the appropriateness of a group of entities having capabilities for fulfilling a mission having requirements, where the entities and mission are represented by unstructured data, structured data, and constraints.

Latent Semantic Analysis

Latent Semantic Analysis (LSA) is a theory and method for extracting and representing the contextual-usage meaning of words by mathematical computations (namely singular value decomposition) applied to a large corpus of text. The underlying concept is that the aggregate of all the word contexts in which a given word does and does not appear provides a set of mutual constraints that largely determines the similarity of meaning of words and sets of words to each other.

Probabilistic Latent Semantic Analysis

Probabilistic Latent Semantic Analysis (PLSA) is one of many unsupervised statistical machine-learning techniques that posit latent "topics," a mixture of which is modeled as generating the words in a document. Additionally, the topics themselves are easily interpretable and thus become an explanatory component for visualization, analysis, and allow for spot inspection of performance.

The PLSA model has been shown to be more accurate than LSA for information retrieval (Hofmann, 1999), and has been deployed in legal, medical and publishing domains with large knowledge repositories.

Matching Resumes and Job Descriptions

Both LSA (Laham, et al. 2000) and PLSA (U.S. Pat. No. 6,728,695, Pathria et al., 2004) have been used to match a single entity represented by unstructured and structured data to a mission represented by unstructured and structured data. The entities in these cases were individuals represented by resumes, and the missions were occupations represented by job postings.

However, methods have not been disclosed that utilize LSA or PLSA to determine the appropriateness of a group of entities for accomplishing the goals of a single mission or a multitude of missions.

BRIEF SUMMARY OF THE INVENTION

The present invention relates in general to a method and system for comparing and maximizing the appropriateness of a group of entities having capabilities for fulfilling a mission having requirements, where the entities and mission are represented by unstructured data, structured data, and constraints. More particularly, embodiments of this invention relate to an effective and accurate method and system to compare and maximize the appropriateness between the group's capabilities and the mission's requirements that are contained, even if only latently, in data sets such as written documents, electronic databases or other repositories of information.

It is an object of one embodiment of the invention to provide a computer-based system and method for comparing a plurality of data objects comprising the steps of providing a first data object, providing a plurality of second data objects, applying a topic model technique to the first data object and the plurality of second data objects creating a topic model, grouping the plurality of second data objects creating a plurality of groupings, determining a similarity of the first data object and the plurality of groupings, determining an optimum similarity of the first data object and the plurality of groupings and representing the optimum similarity.

It is a further object of one embodiment of the invention to provide a computer-based system and method for comparing a plurality of data objects comprising the steps of providing a first data object, providing a plurality of second data objects, applying a topic model technique to the first data object and the plurality of second data objects creating a topic model, grouping the plurality of second data objects creating a plurality of groupings, determining a first similarity of the first data object and the plurality of groupings, determining a second similarity of the plurality of second data objects in each of the plurality of groupings, comparing the first similarity and the second similarity to determine an optimum similarity of the first data object and the plurality of groupings, and representing the optimum similarity.

It is another object of one embodiment of the invention to provide a computer-based system and method for comparing a plurality of data objects comprising the steps of providing a plurality of first data objects, providing a plurality of second data objects, applying a topic model technique to the plurality of first data objects and the plurality of second data objects creating a topic model, grouping the plurality of second data objects creating a plurality of groupings, determining a first similarity of each of the plurality of first data objects and each of the plurality of groupings, determining a second similarity of the plurality of second data objects in each of the plurality of groupings, comparing the first similarity and the second similarity to determine a plurality of optimum similarities of the plurality of first data objects and the plurality of groupings, and representing the plurality of optimum similarities.

It is an object of one embodiment of the invention to provide a computer-based system and method for comparing a plurality of data objects where the topic model technique comprises Probabilistic Latent Semantic Analysis (PLSA) or Latent Dirichlet Allocation (LDA).

It is a further object of one embodiment of the invention to provide a computer-based system and method for comparing a plurality of data objects wherein the step of applying a topic model technique further comprises pre-processing the data objects so that they are normalized.

It is another object of one embodiment of the invention to provide a computer-based system and method for comparing a plurality of data objects wherein the topic model technique is applied to the first data object, the second data objects and at least one third data object to create the topic model.

It is an object of one embodiment of the invention to provide a computer-based system and method for comparing a plurality of data objects wherein the step of determining a similarity of the first data object and the plurality of groupings comprises applying a similarity metric.

It is another object of one embodiment of the invention to provide a computer-based system and method for comparing a plurality of data objects wherein the first data object comprises a requirement and the second data objects comprises a set of capabilities of individuals.

It is a further object of one embodiment of the invention to provide a computer-based system and method for comparing a plurality of data objects wherein the step of determining the optimum similarity of the first data object and the groupings comprises determining the smallest number of second data objects to maximize the similarity of the first data object.

It is a further object of one embodiment of the invention to provide a computer-based method for comparing a plurality of data objects wherein the step of representing the optimum similarities further comprises representing a ranking of the optimal similarities.

An object of one embodiment of the present invention is to provide a method and apparatus for choosing a group or set of entities, as represented by unstructured, semi-structured, and structured documents, that, together, maximally achieve the goals, requirements, or description of a mission, task or goals as represented by one or more unstructured, semi-structured, and structured documents.

Another object of one embodiment of the present invention is to provide a method and apparatus for finding a group or set of people, as represented by unstructured, semi-structured, and structured documents concerning them individually, as a group, or as various sub-groups, such as resumes or other biographical documents, that fulfill the needs as specified in unstructured, semi-structured, and structured descriptions of a task or mission, or a set of missions.

A further object of one embodiment of the present invention is to provide a means for scoring any group of entities that together achieve the goals of the mission, such that other requirements and constraints that might either hinder or enhance that group of entities from engaging in the mission, such as availability, cost, measures of relationships between the entities (e.g., as provided by social network analysis (SNA), or other biases, constraints and/or relevant factors that could be incorporated and weighed against the match of the group of entities to the mission.

Additionally, one embodiment of the present invention provides a means for creating the minimally sized set of entities that can achieve the mission. These sets may be ranked by a score that reflects both how well they may achieve the mission goals, and yet have entities in the set that have minimal overlap amongst themselves to reduce redundancy and other costs, and/or maximize diversity.

Further, one embodiment of the present invention may reverse the ranking of groups of entities to mission requirements, and instead rank missions such that they reflect how well a particular set or group of entities may achieve each mission goal, or set of mission goals. Missions may also be ranked by the maximally scoring group of entities from a power set of entities, such as all possible teams composed of employees of a company. Other measures of the set of teams may include the average of the power set of entities, or other such statistical measures. These measures can provide a means for ranking and determining whether any set from a limited group of entities (e.g., only those employed by a particular company, or by a particular organizational unit within a company) is capable of achieving the mission, and thereby providing a means for determining whether to attempt the mission at all.

One embodiment of the present invention also involves measuring only the diversity of a set of entities as derived from unstructured, semi-structured, and structured documents concerning them, without respect to any mission or goal. Such diversity may encompass a wide range of attributes, including but not limited to skills, organizational unit, and/or position or demographic factors.

Beyond the application of this method and system to multiple member teams to one or more problem sets, this method and system can also be used to compare almost any type of multi-dimensional set of capabilities to a multi-dimensional set of requirements.

DESCRIPTION OF THE INVENTION

The present invention is illustrated by, but by no means limited to, the following description of a preferred embodiment. In particular, the system and method will be described as an embodiment of comparing a set of documents representing individual members of a group of people to a set of documents representing a mission to be accomplished by a set of members of that group of people. It is understood, that other embodiments of the invention can be applied to many other data objects. In particular, it is well understood that the systems and methods described can be applied to, but not limited to, electronic data sources such as social web sites or audio data sources, such as cell phone transmissions, that can be converted into electronic data sources.

Throughout this description, the term "data object" is used to describe any grouping of data. Examples of data objects include but are not limited to documents, emails, audio files, financial reports, streaming media and photographs.

The System:

The following discussion provides a brief, general description of a suitable computing environment in which one embodiment of the present invention may be implemented. The invention will often be practiced on a single computing device, but can also be implemented on a client computing device and/or a server or other remote computing device connected by a communication network. The system comprises a computer based system for enabling a user to compare and maximize the appropriateness of a group of entities having capabilities for fulfilling a mission having requirements, the computer based system comprising: memory in which are stored machine instructions that define a plurality of functions; a display; a user input device for input of data; at least one processor that is coupled to the memory, the display, and the user input device; and said processor executing the machine instructions to carry out a plurality of functions.

In the preferred embodiment of this system, the processor accepts user input and executes the machine instructions to carry out the plurality of functions, including the methods described below.

Those skilled in the art will appreciate that this invention might also be practiced with other computer system configurations, such as a client device for executing personal productivity tools, including hand-held devices, pocket personal computing devices, other microprocessor-based or programmable consumer electronic devices, multiprocessor systems, network PCs, minicomputers, mainframe computers, and the like. Furthermore, the present invention can also be practiced in distributed computing environments, where tasks are performed by remote processing devices that are linked through a communications network. In a distributed computing environment, machine instructions may be located in both local and remote memory storage devices.

Figure 1:
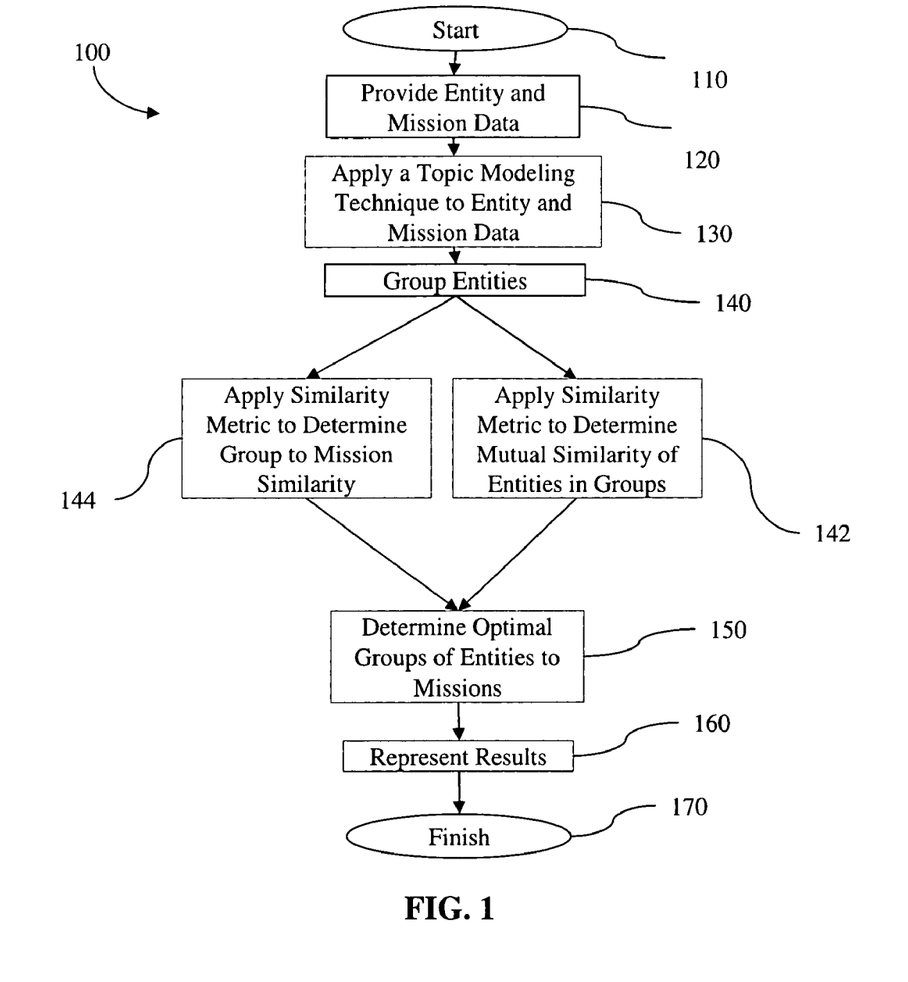
FIG. 1 is a flow diagram of one embodiment of this invention.

The Method:

The following steps, as shown in FIG. 1, describe a preferred embodiment of the methods of the disclosed invention.

Providing Data Objects

Referring to FIG. 1, following the start 110, the first step 120 of the process comprises providing multiple sets of data objects. In a preferred embodiment, these data objects are textual documents or textual data objects that represent entities and missions and are separated into entity data and mission data respectively.

Figure 2:
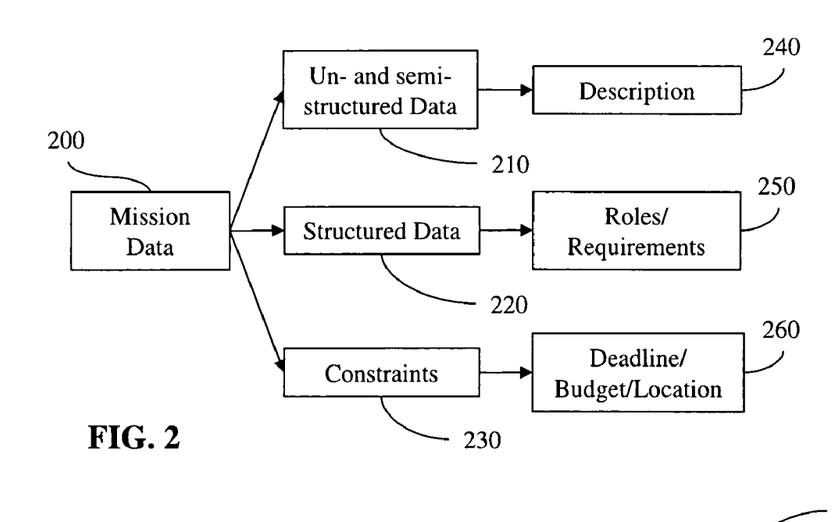
FIG. 2 is a visual depiction of the possible contents of mission data in one embodiment of this invention.

As shown in FIG. 2, a mission can be represented by mission data 200 describing a task or tasks that need to be accomplished, possibly including, when, how and why they must be done. This mission data 200 may take the form of unstructured or semi-structured data 210, structured data 220 as well as a set of constraints 230. The unstructured and semi-structured data 210 for a mission may consist of a written description of what the mission entails. As an example of this embodiment, the unstructured and semi-structured data may be in the form of a request for proposals (RFP) as issued by the Small Business Innovative Research (SBIR) program of the U.S. Government. These RFPs generally consist of text divided into sections (semi-structured data 210) describing the overall objective, a description 240 of the background and technology, and the goals sought in phase I and phase II of the program, the text of which are considered unstructured data 210, though other aspects of these documents can be considered features as described below.

A mission might have additional structured data 220 associated with it describing the roles or minimal requirements 250 for the entities participating in the mission. In one embodiment, a company wishing to submit a proposal to the SBIR program might further define structured data 220 for various roles needed to fulfill this mission, and minimal requirements for these roles, such as having a person with a Ph.D. being bid as the primary investigator.

A mission may also have constraints 230 associated with it. In one embodiment, these constraints may consist of temporal deadlines, financial budgets, or geographical locations 260, though this does not exclude any number of other possible constraints applied to entities for success of a mission. In one embodiment, these constraints may consist of a certain period of performance in the SBIR program, requiring people to have time available during this period.

Other examples of objects that could be characterized into the mission data type include, but are not limited to, data as that may be found in a job posting, tasks in a statement of work, tasks in a mission statement, investment goals for an individual, investment goals for an organization, descriptions of a software program, descriptions of a drug treatment goal or any data object that that can be used to define a set of requirements. In addition, other data objects that are considered to be missions may in fact be entities in a different scenario. For example, to replace an employee who has left the company, all of the documents used to characterize that employee may act as the data for the mission, and a group of one or more other employees then are entities which must fulfill the former employees' duties.

Figure 3:
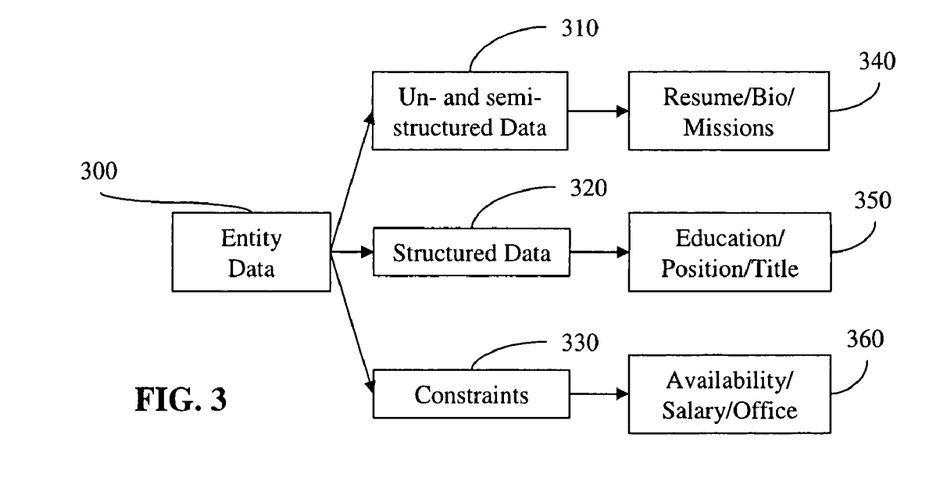
FIG. 3 is a visual depiction of the possible contents of entity data in one embodiment of this intention.

As shown in FIG. 3, an entity can also be defined by entity data 300 that can comprise unstructured and semi-structured data 310, structured data 320 and constraints 330. In one embodiment of the invention, the entity is an employee, and the unstructured and semi-structured data 310 consists of documents 340 describing the employee's work history, such as one or more resumes, biographical descriptions, descriptions of previous jobs or missions (including mission data), or other documents that the employee has generated or consumed, such as books, web-pages, and the like.

Entities may also have structured data 320 associated with them. In one embodiment where the entity is an employee, structured data 320 concerning the employee may include education level, courses taken, certificates awarded, years working at the company, current position or title, and other such facts about the employee 350.

Entities may also have constraints 330 associated with them. In one embodiment where the entity is an employee, the constraints may comprise availability 360, salary, and ability to travel to other locations.

Other embodiments of entities and their corresponding entity data include, but are not limited to, entities such as pieces of equipment, data relating to pieces of equipment, investment products, the attributes of a particular investment vehicle, the attributes of particular drugs, attributes of software modules or any data object representing elements that can be used to satisfy a set of requirements.

Apply Topic Modeling Technique

Referring again to FIG. 1, with the data provided in step 120, a topic model technique is applied 130 to the data. Topic modeling techniques such as Probabilistic Latent Semantic Analysis (PLSA; Hofmann, 1999) as disclosed in U.S. Pat. No. 6,687,696 which is herein incorporated by reference and Latent Dirichlet Allocation (LDA, Blei et al. 2003) model objects as combinations of latent variables, or "topics," each of which is a probability distribution over features. In the most common case, the objects are documents and the features are words in the documents, though, for example, the objects could be images and the features visual ones like line orientation (Sivic, et al. 2005). Fitting the parameters of the model involves learning the various distributions with respect to a set of data: the set of topics $P(z)$, their feature distributions $P(w|z)$ and the topics of each object $P(z|d)$. In this preferred embodiment, fitting the parameters of the topic model 130 comprises the process of tempered expectation-maximization (Hofmann, 1999) for PLSA. In another embodiment, the application of a topic modeling technique would consist of using Markov chain Monte Carlo (MCMC) to train an LDA model (Griffiths et al, 2004).

Although not necessary, the application of these modeling techniques can start with a pre-processing step to normalize the features used across all data sets, and in this embodiment, all documents. In the case of text documents, this pre-processing step may include, but is not limited to, changing word case, translating words from different languages, stemming words to their root and converting all words and multi-word terms to a numerical index value.

In this step 130, one topic model can be created from all the provided data or multiple topic models can be created from subsets of the data. For example, one model may consist of only entity data, and another model may consist of only mission data. It is also contemplated that model techniques can also create topic models from related data objects that are neither mission data nor entity data, such as a large pool of resumes, or job listings, standardized job descriptions such as the U.S. Department of Labor's Occupational Information Network, historical missions, or large data or document collections such as the articles in Wikipedia. Similar pre-processing and feature extraction could occur with these data objects as well before producing a topic model.

Group Entities

Figure 4:
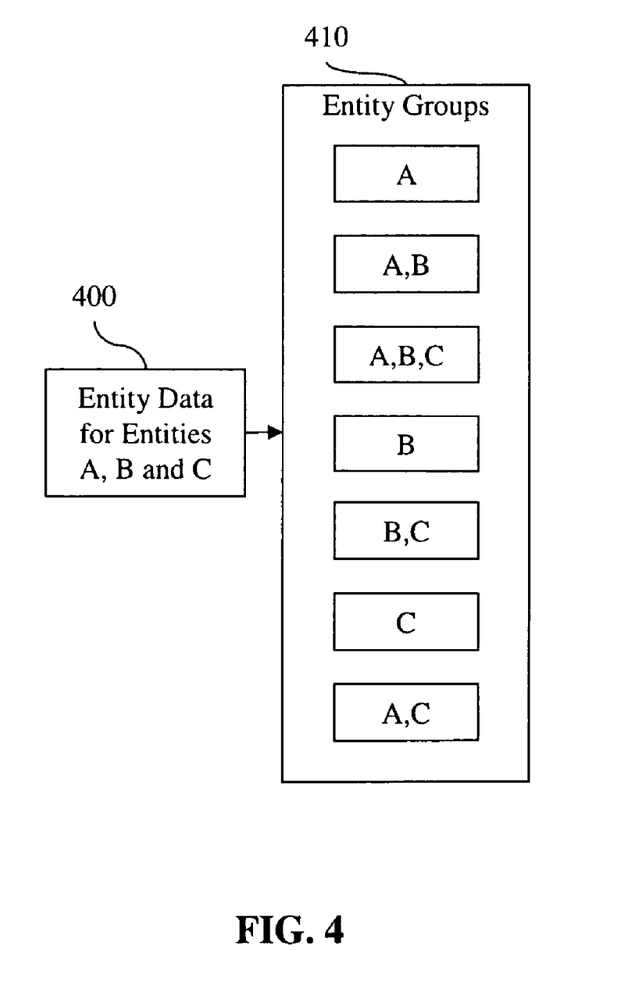
FIG. 4 is a graphic showing the groupings of entities in one embodiment of this invention.

After the creation of the topic models, the entities are represented in all possible grouping of entities in step 140. An example of this grouping is shown in FIG. 4 where the entity data 400 for three entities A, B and C is grouped as all possible sets (the power set) of entities 410 from the pool of entity data 400.

Apply Similarity Metric

Referring again to FIG. 1, the next steps of this method comprise applying a similarity metric to determine both the similarity between entities in groups 142 and the similarity between each group of entities and the mission 144.

In this embodiment, when using a topic model technique such as PLSA or LDA, a similarity metric between two objects (e.g, an entity and a mission) can be the probability of the mission (M) given the entity (E), via the latent topics (z):

$$P(M \mid E) = \sum_{z} P(M \mid z) P(z \mid E).$$

Where the mission and entity are represented by their associated documents and some document types may have different weights.

Other methods of similarity may project the topic profile (P(z|E) for all z) of both the mission and the entity into a single topic space and use the cosine between the two vectors as the measure of similarity. Yet another method of measuring similarity may be the sum of differences (or squared differences) between the mission P(z|M) and entity P(z|E) across all topics.

If multiple topic models are created, then each topic model may have its own similarity metric, and the overall similarity between two objects could be the sum, average or other statistical measure of the individual similarity metrics.

In this embodiment, two similarity measures are determined for each entity group formed from step 140. The first measure is the group to mission similarity 144 which represents the similarity of a mission to that group of entities, as a whole or as a sum of individual entities. In this embodiment, all documents associated with all of the entities are used to determine the similarity to the documents associated with the mission. In other embodiments, the similarity between individual entities and the mission are all obtained and then combined. The second measure obtained for every group from step 140 is the mutual similarity of entities in groups 142. The mutual similarity of entities in groups 142 is defined as the sum, or other statistical combination, of the similarity of every member of the group with all other members of that group. A group with just one member has a mutual similarity of zero.

Determine Optimal Groups of Entities to Missions

With the similarity determinations from steps 142 and 144, step 150 can determine the optimal group of entities to missions.

In this embodiment, for each group of entities from step 140, the group to mission similarity 144 is compared to the mutual similarity of entities to groups 142 to determine the optimal groups of entities to missions 150. In this embodiment, the determination results from seeking to maximize the group-mission similarity, but minimize the mutual similarity. Such a comparison, would, for example, be effective for determining the minimum spanning set, or the minimum number of entities required to fulfill the mission; that is, a new entity is added to a group only insofar as the additional entity fulfills more of the unfulfilled requirements of the mission than has similarity to other entities already in the group. The result of this embodiment is a ranking of all possible sets of entities as they compare to the requirements and constraints of a mission.

Other comparisons are also possible to determine the optimal grouping of entities to mission. Recognizing the possibility of additional data types as shown in FIGS. 2 and 3, the structured data of the entities and the mission could also be compared such that specific requirements are met. In one embodiment, the mission may have a requirement for a person with a Ph.D., in which case the structured data for at least one member of the group must have a Ph.D. The constraints of the mission and of the entity pool could also be compared. In one embodiment, the mission may have a budget constraint which would be compared to the sum of the salaries required for the employees in each group. Together, the three comparisons can be combined to create a single ranking of the entity groups most appropriate for the mission as described by the unstructured data, fulfill the requirements as defined by the structured data, and yet comply with all of the constraints.

A further result of this embodiment is a score of mutual similarity for all possible sets that minimizes or maximizes the number of entities, and/or minimizes or maximizes the mutual similarity or any other measure of the set, and the associated scores that could be further processed In another embodiment, if multiple missions and entities are provided, a power set of the entities are compared to all the mission data and for each mission, the highest ranking set of entities is determined, and the missions are in turn ranked by the score of the highest ranking set. The result of this embodiment is a ranking of missions by the appropriateness of any set of entities, and the associated scores that could be further processed.

Further recognizing the data types shown in FIGS. 2 and 3, the three comparison types described above may be weighted, or have veto-like power of the other types for allowing, disallowing, or re-ranking groups. In addition, the order of these operations may be changed and intermixed with the determining of which groups from step 140 proceed to have the mutual similarity and group-mission similarity even calculated. Other information may be used in this step to add biases, preferences, or weighting based on other aspects of the set of entities or of the mission.

Specific algorithms are described in this embodiment; however the invention is not limited to these methods of comparison. Any methodology of comparing and ranking data sets can be used to determine the appropriateness of the group of entities to the mission requirements.

Represent Results

The results of step 150 are represented in step 160. These results may be presented to a user through a computer's graphical user interface or it may be represented to another process, such as a computer-based process, for further processing.

In this embodiment, the results are displayed to a user through the graphical user interface of a computer which allows the user to manipulate the mission requirements, even going so far as to making a requirement the inclusion or exclusion of a particular entity. The user might also wish to change the constraints to determine if the optimal group changes. For example, in one embodiment, the user might alter a constraint, such as reducing the budget to see if a group of entities still exists from the entity pool that is within budget but can still achieve the mission. Any number of re-rankings or requirement and constraint manipulation are envisioned in the present invention.

OPERATIONAL EXAMPLE OF ONE
EMBODIMENT OF THE INVENTION

The present invention is further illustrated by, but by no means limited to, the following description of the operation of the above embodiment of the invention within a computer based system. Following the steps shown in FIG. 1, this example illustrates PLSA being used to quantify the extent to which a group of candidates matches the requirements of a task, with the goal of finding the minimal spanning set (MSS) of entities that matches the mission. Thus, the entities here are candidates and the mission is a task. The results of this specific implementation of the process are graphically illustrated in FIG. 5

In this embodiment nine entities were provided, step 120, as represented by individual candidates A, B, C, D, E, F, G, and H. The candidates are represented by data objects comprising electronic documents describing their skills and might include work history in the form of a resume. Task data was provided, step 120, as represented by a data object comprising a description of a new user interface that helps managers to organize their time according to the latest methods.

The parameters of a PLSA topic model are fitted to a large corpus of mission descriptions. The probability of the topics given the current task description indicate that four topics are most probable. Observing the most probable words in these four topics, they are labeled: Design, Management, Research, and Software.

Figure 5:
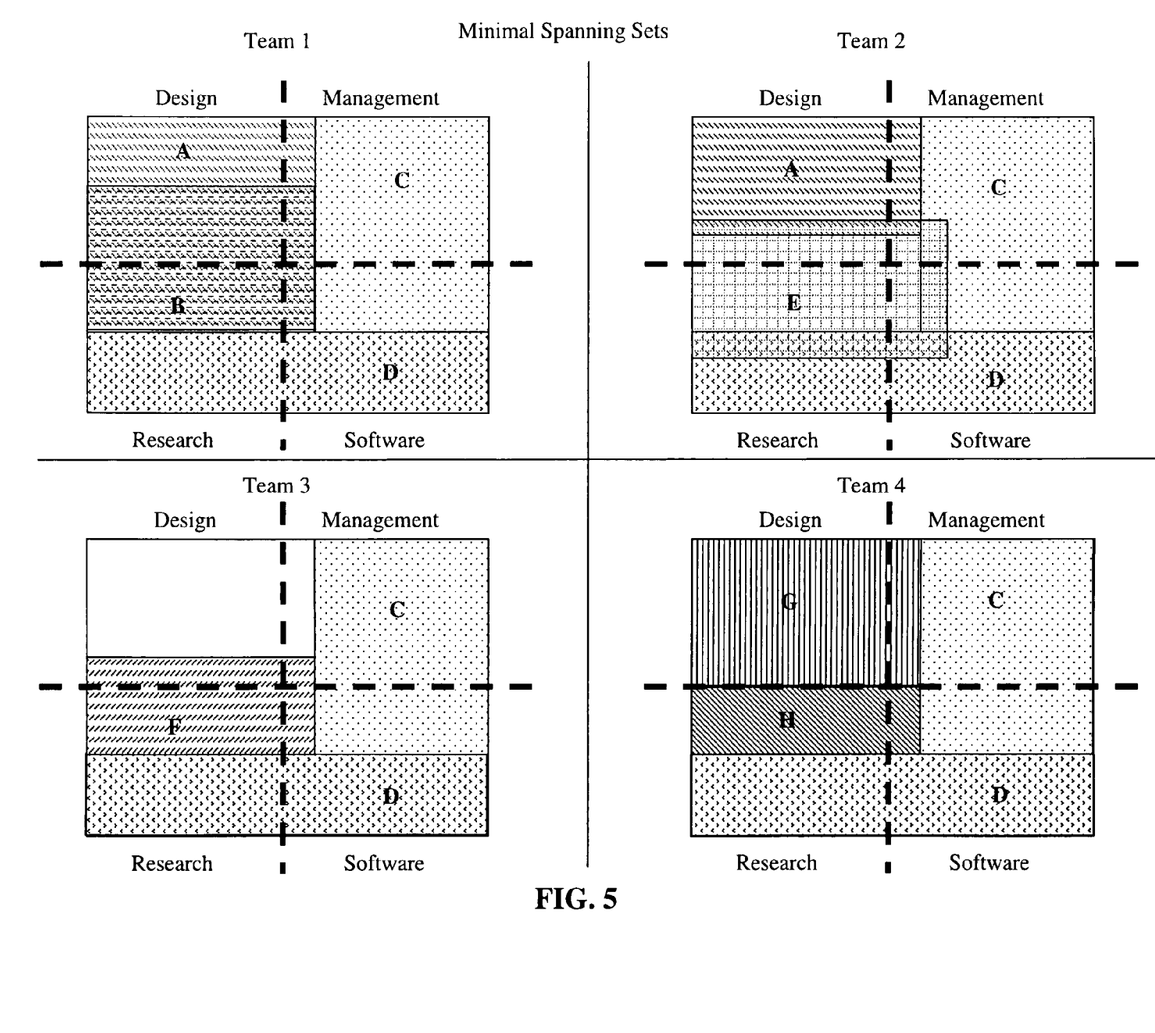
FIG. 5 is a graphic representation of the results of one embodiment of this invention.

The overall square in each of the four graphics of FIG. 5 illustrates visually the "space" of the requirements from the task description provided. The four quadrants of the square then represent 100% of the labeled topic probability.

Based on applying the PLSA topic model technique to the documents associated with individual candidates, step 130, each candidate is shown to cover a mission quadrant insofar as the probability of the topic given the candidates' data approaches the probability of the topic given the mission description.

For simplicity purposes, for step 140, the grouping of entities is limited to four groups of entities in FIG. 5. Team 1 consists of four members: A, B, C and D. Team 2 consists of A, C, D, and E. Team 3 consists of only 3 members: C, D and F. Team 4 consists of 4 members G, C, D and H.

Once the entities are grouped, the similarity metric is applied. Applying the group to mission similarity, step 144, is graphically shown as the ability of the group of entities to cover the requirements of the mission as represented by the "space" within the square. Applying the mutual similarity of entities in groups, step 142, is graphically shown as the space between, or the overlap of entities in the square. A space represents a gap in team skills when compared to the mission. An overlap with another entity represents an overlap in skill sets within that team.

Given the similarities, each of the four groups is then analyzed to determine optimal groups of entities to missions, step 150. In this embodiment, the optimal group of entities to missions is a group of entities that fills all aspects of the mission with the fewest possible entities: the minimal spanning set. In this embodiment, the determination of the optimal group is visual. As can be seen with team 1, the mission is covered, however candidate B completely overlaps with Candidate A, thus this is not a minimal spanning set. With team 2, candidate E, while not completely overlapping with the skills of the other three, does have some redundancy with them. With team 3, while there is no overlap among the team members, this team cannot fulfill all the aspects of the mission, so it is not the best team. With team 4, this team fills all the skills required of the mission, and has no overlap, that is the mutual similarity is zero, so this is a minimal spanning team.

An additional team could also be considered. For example, Team 1 could be considered without candidate B. This team would also be a minimal spanning team. However, since candidate A would be required to do four different kinds of jobs, this team may need more time to accomplish the mission than Team 4, where no candidate has more than two jobs. This may be a constraint comparison that could interact with the similarity comparison.

Other constraints might also be incorporated from social network analysis or mission data, such as the need for a clear leader and only candidate A has a high "centrality"; or perhaps historical data indicate that when candidates B and C are together on a team that the mission has a tendency to fail and thus should not be on the same team.

In any case, the Minimal Spanning Set score will allow users to understand what the trade-offs may be and incorporate them numerically with other aspects of the team and mission.

The results in this embodiment are represented, step 160, in FIG. 5 as a two dimensional graphic that can be used to select the optimal group. It is understood that in similar situations with more complicated missions or more candidates, the determination of optimal groups of entities to missions can be made with the assistance of algorithms that calculate entities that maximize a fit with the mission and also calculate the minimum overlap between entities.

TESTING RESULTS OF ONE EMBODIMENT OF
THE INVENTION

A test of one embodiment of the methods disclosed was run by Aptima, Inc. utilizing 142 Requests for Proposals (RFPs) from a recent batch of Department of Defense Small Business Innovation Research program. Of these, 25 were chosen by Aptima's management as being relevant to their work and 117 were rejected. Ten RFPs were subsequently responded to, and 4 were won.

Referring to FIG. 1, the RFPs represented the mission data, which are generally one page single spaced. The entity data was represented by 185 biographies (typically 1-2 paragraphs) of current and previous Aptima employees and consultants. Both the RFPs and the biographies were analyzed with the PLSA technique using a 40-topic model. That is, each biography and RFP, plus an additional 327 RFPs from a previous round, were treated as documents, pre-processed to normalize the terms, and the ensuing set of terms and documents used as input to fit the parameters of a forty topic model. Table 1 below illustrates the top ten most probable features from four of the topics in the model, in this case the features are words and their stems (e.g., materials, material, and materialization, would all be stemmed to "materi"). Even with this small amount of data some very clear topics emerge, e.g., Topic 10 is about composite materials for making parachutes and Topic 16 is about game-based training of cultural behaviors and interactions.

TABLE 1

| Topic 10 | Topic 12 | Topic 16 | Topic 37 |
| --- | --- | --- | --- |
| Materi | Health | Cultur | Human |
| Composit | Medic | Cultural | Factors |
| Materials | Diseas | Train | Factor |
| Composite | Care | Game | Design |
| Parachut | Clinic | Training | Interaction |
| Polym | Medical | Behaviors | Interfac |
| Textil | Clinical | Interactions | Interact |
| Composites | Blood | Behavior | Usabl |
| Fiber | Food | Cultures | Usability |
| Parachute | Ahlta | Interact | interface |

For the similarity comparisons, the concept of a minimal spanning set described above was used. For the group to mission similarity, the sum of the probabilities of each team member matching the RFP was used; and for the mutual similarity of entities to groups, the sum of the probabilities of all combinations of one employee bio generating another was used. The team's score of being a minimal spanning set (MSS) was calculated by subtracting the mutual similarity from the group-mission similarity:

$$MSS_{E_{11}...N} = \sum_n P(RFP|E_n) - \sum_{i \neq j} \sum_j P(E_i|E_j)$$

For each RFP, groups consisting of 2-5 people (not the entire power set due the constraint that more than 5 people is unaffordable) from the 10 people most similar to the RFP were examined. This was done to reduce processing time, but is not necessary to the invention. The MSS of the team with the maximum score was used to compare the sets of RFPs: Rejected, Chosen, Submitted, and Won.

Figure 6:
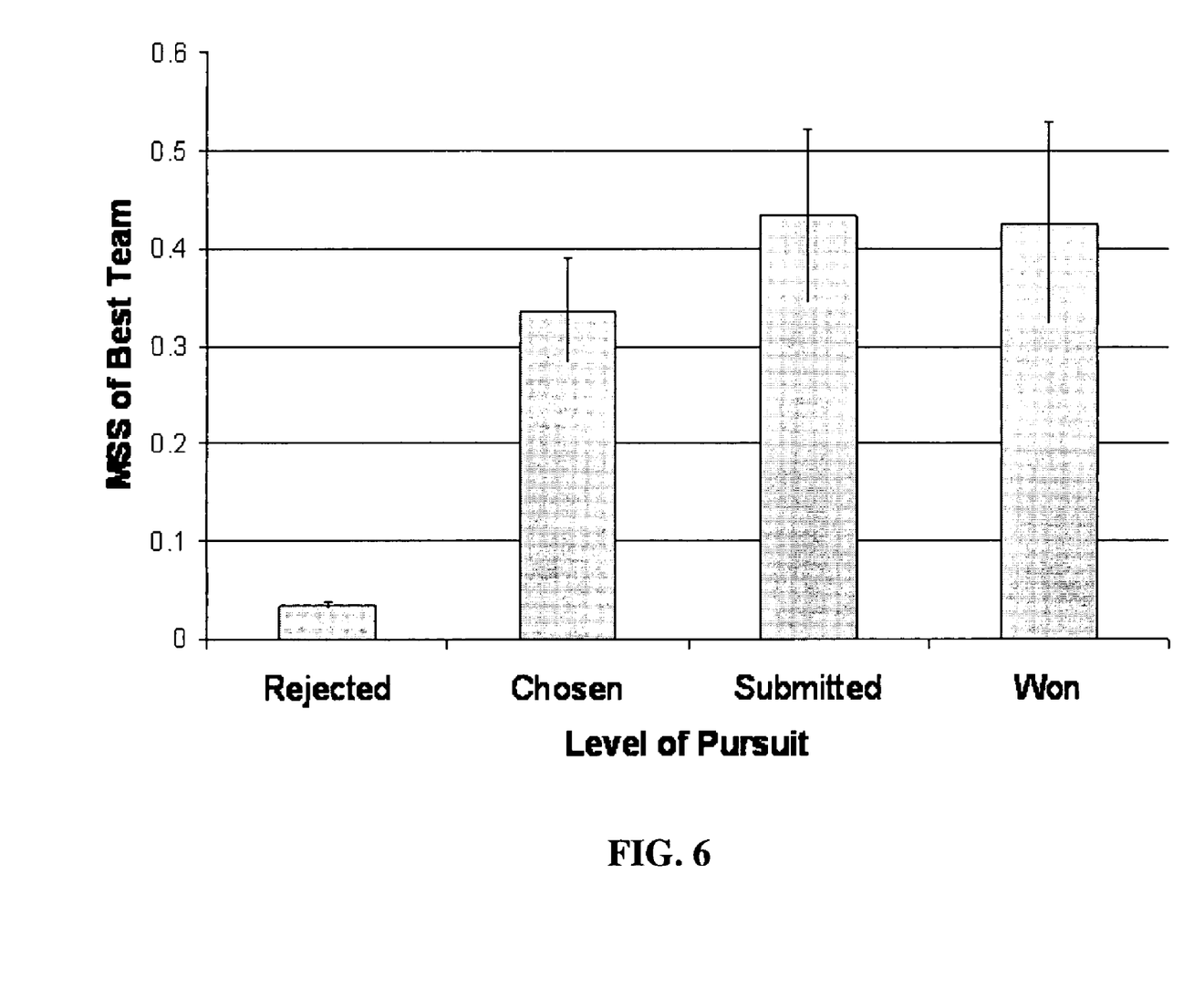
FIG. 6 is a graphic representation of the result of a test of one embodiment of this invention.

The results shown in the FIG. 6 indicate that the present invention is capable of automatically determining which RFPs the company should respond to and those they are most likely to win. Especially in the case of management choosing to submit a proposal or not for an RFP, one might consider this automatic process as mimicking the process of management: reading the RFP, getting a "gist" of what is about, then comparing that to the gist of skills present at the company.

ALTERNATIVE EMBODIMENTS OF THE INVENTION

Although the embodiments described above include implementations of PLSA and LDA as topic model techniques, it is recognized that any number of a range of topic modeling techniques may be used for determining that a set of entities may achieve the mission, or have a certain similarity (or alternatively dissimilarity) amongst themselves. These other techniques may include, but are not limited to, any means for measuring the similarity of data representing the entities and the mission. Various forms of latent variable methods, such as Latent Semantic Analysis (LSA), independent components analysis (ICA), or any other means of measuring the similarity of documents could be used for both determining the ability of a set of entities to achieve a task, and determining the overall overlap, or mutual similarity of a group of entities. Additionally, the utilization of topic models to images and other graphic data are contemplated in alternative embodiments of this invention. Known improvements to all of the contemplated modeling techniques, such as to simultaneously extract other features of the documents, such as syntax via hidden Markov models (Griffiths, et al., 2004) or collocations (Griffiths et al., 2007), and any other improvements are also envisioned to fall within this invention. Additionally, the results of non-simultaneous methods of feature extraction, and improvements to feature extraction methods, are also envisioned, such as various techniques of information extraction (e.g., Appelt & Israel, 1999).

In one embodiment, as compared to the embodiment shown in FIG. 1, it is also contemplated that the group to mission similarity, step 144, is not performed and only the mutual similarity for each group of entities, step 142, is considered. Although not necessary, this embodiment can be further enhanced by allowing elements shown in FIG. 3, such as structured entity data 320 and entity constraints 330 to be used for ranking and eliminating groups 140 from consideration. These constraints might minimize, or maximize, the number of entities, or any other measure of the group as a whole, for a given mutual similarity value.

In another embodiment, the methods shown in FIG. 1 have an additional step of feature extraction performed with methods similar to the application of the topic modeling technique 130. This feature extraction is based on the concept that the words in a topic model are merely features, thus other features may be added to the set of features for any given document. Feature extraction could be based on using a different topic model that additionally extracts collocations (Griffiths et al., 2007) or Hidden Markov Models (Griffiths et al, 2004). Other features of the documents may include author, or source, document citations, or other metadata associated with the documents. Other features may be derived by means of information extraction such as entity, relationship, or event extraction as tested by the Automatic Content Extraction program (http://www.nist.gov/speech/tests/ace/) or simpler semantic role labeling (Palmer et al., 2005). The results of parsing the sentences in the documents into "trees" (Markus et al., 1993) could also be added as features of the document.

As mentioned above, other embodiments may include adding the structured aspects of the data associated with a mission or entity as features to all documents associated with a mission or entity.

Any of a number of standard methods may also be used to pre-process the data as part of the topic modeling technique.

These pre-processing methods may include stemming, changing case, translating from one language to another, or reducing synonyms to a single term.

Other embodiments may be created in domains where optimum similarity is defined as minimizing similarity. For example, one might want to maximize the diversity of students accepted at a college, or the companies, or funds, in a fund. Documents and data representative of the students (e.g., college application materials) or of the companies (e.g., annual reports, or 10Ks), or of the funds (e.g., prospectuses) would be analyzed via the topic model to determine the mutual similarity of all possible sets of entity documents. From the power set, groups of entities could be ranked, such that the highest ranked groups had the least mutual similarity, but perhaps had the largest total number of entities. The mutual similarity of these sets could also be compared to the group to mission similarity where the mission is described by various documents such as the teaching interests (e.g., journal papers) of the college faculty.

It is understood that some embodiments of the invention may treat a single mission within a larger set of missions, or a mission may have tasks and sub-tasks requiring different sets of entities to accomplish those tasks. In this case, the outputs of the determination of optimal groups of entities to missions may be further constrained to achieve an overall optimum assignment of entities to missions across a superset of all missions, tasks, and sub-tasks. For example, consider two missions, Mission 1 and Mission 2, and 6 entities, A-F. Individually, the optimal group of entities for Mission 1 might be A, B, and C; and for Mission 2, C, D, E. However, since some embodiments may not allow C to take part in two missions simultaneously, the goal now is to determine which mission C should partake in, and in which mission should F should substitute for C. This could be determined, for example, by summing the scores for both Missions 1 and 2, for only those groups of entities where no entity is used for both missions. Similarly, tasks and sub-tasks might require continuity of entities, such that the optimal assignment of entities to missions uses the sum of scores across missions for only those groups in which an entity is assigned to all or some of the sub-tasks.

This invention is not limited to the methods and systems described in the embodiments above. The methods of this invention are easily incorporated into computer systems and data networks that allow certain steps of these methods, such as input and output, to be performed on client machines connected to a computer network while the computational steps and data set storage can be done through a server in a client-server model or other distributed computing architecture. It is also envisioned that the methods can be used over a wireless computer network to include wireless computers, wireless phones or other wireless data network.

With respect to the above description then, it is to be realized that the optimum relationships for the steps and components of this invention, to include variations in acquiring data sets, pre-processing data sets, comparing data sets, ranking results and displaying results are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Although this invention has been described in the above forms with a certain degree of particularity, it is understood that the present disclosure has been made only by way of example and numerous changes in the details of construction and combination and arrangement of parts may be resorted to without departing from the spirit and scope of the invention.

What is claimed is:

1. A computer-based method for comparing a plurality of data objects comprising the steps of:
   providing a first data object;
   providing a plurality of second data objects;
   providing at least one data object;
   applying a topic model technique to the first data object, the plurality of second data objects and the least one third data object creating a topic model;
   the topic model technique further comprises pre-processing the first data object, the plurality of second data objects and the least one third data object whereby the data object are normalized;
   grouping the plurality of second data objects creating a plurality of groupings;
   determining a similarity of the first data object and the plurality of groupings;
   determining an optimum similarity of the first data object and the plurality of groupings; and
   representing the optimum similarity.

2. The computer-based method of claim 1 wherein the topic model technique comprises Probabilistic Latent Semantic Analysis (PLSA).

3. The computer-based method of claim 1 wherein the topic model technique comprises Latent Dirichlet Allocation (LDA).

4. The computer-based method of claim 1 wherein the step of determining a similarity of the first data object and the plurality of groupings comprises applying a similarity metric.

5. The computer-based method of claim 1 wherein the first data object comprises at least one requirement and the plurality of second data objects comprises a plurality of capabilities of a plurality of individuals.

6. The computer-based method of claim 1 wherein the step of determining the optimum similarity of the first data object and the plurality of groupings comprises determining the smallest number of the second data objects to maximize the similarity of the first data object.

7. The computer based method of claim 1 wherein:
   the first data object represents a requirement;
   the plurality of second data objects represents a plurality of entities; and
   the at least one third data object represents a data object other than the requirement and the plurality of entities.

8. A computer-based method for comparing a plurality of data objects comprising the steps of:
   providing a first data object;
   providing a plurality of second data objects;
   providing at least one third data object;
   applying a topic model technique to the first data object, the plurality of second data objects and the at least one third data object creating a topic model;
   the topic model technique further comprises pre-processing the first data object, the plurality of the second data objects and the at least one third data object whereby the data object are normalized;
   grouping the plurality of second data objects creating a plurality of groupings;
   determining a first similarity of the first data object and the plurality of groupings;

determining a second similarity of the plurality of second data objects in each of the plurality of groupings;

comparing the first similarity and the second similarity to determine an optimum similarity of the first data object and the plurality of groupings; and representing the optimum similarity.

9. The computer-based method of claim 8 wherein the topic model technique comprises Probabilistic Latent Semantic Analysis (PLSA).

10. The computer-based method of claim 8 wherein the topic model technique comprises Latent Dirichlet Allocation (LDA).

11. The computer-based method of claim 8 wherein the step of determining the first similarity and the second similarity comprises applying a similarity metric.

12. The computer-based method of claim 8 wherein the first data object comprises at least one requirement and the plurality of second data objects comprises a plurality of capabilities of a plurality of individuals.

13. The computer-based method of claim 8 wherein the step of determining the optimum similarity of the first data object and the plurality of groupings comprises minimizing the second similarity and maximizing the first similarity.

14. The computer based method of claim 8 wherein:
the first data object represents a requirement;
the plurality of second data objects represents a plurality of entities; and
the at least one third data object represents a data object other than the requirement and the plurality of entities.

15. A computer-based method for comparing a plurality of data objects comprising the steps of:
providing a plurality of first data objects;
providing a plurality of second data objects;
providing at least one third object;
applying a topic model technique to the plurality of first data objects, the plurality of second data objects and the at least one third data object creating a topic model;
the topic model technique further comprises pre-processing the plurality of first data object, the plurality of second data object and the at least one third data object whereby the data objects are normalized;
grouping the plurality of second data objects creating a plurality of groupings;
determining a first similarity of each of the plurality of first data objects and each of the plurality of groupings;
determining a second similarity of the plurality of second data objects in each of the plurality of groupings;
comparing the first similarity and the second similarity to determine a plurality of optimum similarities of the plurality of first data objects and the plurality of groupings; and
representing the plurality of optimum similarities.

16. The computer-based method of claim 15 wherein the topic model technique comprises Probabilistic Latent Semantic Analysis (PLSA).

17. The computer-based method of claim 15 wherein the topic model technique comprises Latent Dirichlet Allocation (LDA).

18. The computer-based method of claim 15 wherein the step of determining the first similarity and the second similarity comprises applying at least one similarity metric.

19. The computer-based method of claim 15 wherein the first plurality of data objects comprises a plurality of requirements and the plurality of second data objects comprises a plurality of capabilities of a plurality of individuals.

20. The computer-based method of claim 15 wherein the step of determining the plurality of optimum similarities of the plurality of first data objects and the plurality of groupings comprises minimizing the second similarity and maximizing the first similarity.

21. The computer-based method of claim 15 wherein the step of representing the plurality of optimum similarities further comprises representing a ranking of the plurality of optimal similarities.

22. The computer-based method of claim 21 wherein the ranking of the plurality of optimal similarities comprises ranking the plurality of optimal similarities to maximize a superset of optimal similarities.

23. The computer based method of claim 15 wherein:
the plurality of first data objects represents a plurality of requirements;
the plurality of second data objects represents a plurality of entities; and
the at least one third data object represents a data object other than the plurality of requirements and the plurality of entities.

24. A computer readable memory having stored thereon a computer program that, when executed, causes a computer to perform the steps of:
providing a first data object;
providing a plurality of second data objects;
providing at least one third data object;
applying a topic model technique to the first data object, the plurality of second data objects and the at least one third data object creating a topic model;
the topic model technique further comprises pre-processing the first data object,
the plurality of second data objects and the at least one third data object whereby the data objects are normalized;
grouping the plurality of second data objects creating a plurality of groupings;
determining a similarity of the first data object and the plurality of groupings;
determining an optimum similarity of the first data object and the plurality of groupings; and
representing the optimum similarity.

25. The computer-readable memory claim 24 wherein:
the first data object represents a requirement;
the plurality of second data objects represents a plurality of entities; and
the at least one third data object represents a data object other than the requirement and the plurality of entities.

* * * * *

UNITED STATES PATENT AND TRADEMARK OFFICE
CERTIFICATE OF CORRECTION

| | | |
|---|---|---|
| PATENT NO. | : 7,822,750 B2 | |
| APPLICATION NO. | : 12/014750 | |
| DATED | : October 26, 2010 | |
| INVENTOR(S) | : Andrew Duchon et al. | |

It is certified that error appears in the above-identified patent and that said Letters Patent is hereby corrected as shown below:

Claim 1, col. 14. ln. 13 reads "providing at least one data object". This line should read "providing at least one third data object". The word "third" is missing from this line.

Claim 15, col. 15, ln. 34 reads "providing at least one third object". This line should read "providing at least one third data object". The word "data" is missing from this line.

Signed and Sealed this
Fifteenth Day of March, 2011

David J. Kappos
*Director of the United States Patent and Trademark Office*